(12) United States Patent
Betten

(10) Patent No.: US 6,522,113 B1
(45) Date of Patent: Feb. 18, 2003

(54) SYNCHRONOUS COUPLED INDUCTOR SWITCHING REGULATOR WITH IMPROVED OUTPUT REGULATION

(75) Inventor: John Betten, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/013,061

(22) Filed: Dec. 6, 2001

(51) Int. Cl.[7] .............................................. G05F 1/563
(52) U.S. Cl. ...................................................... 323/282
(58) Field of Search ................................. 323/265, 282, 323/283, 351

(56) References Cited

U.S. PATENT DOCUMENTS

| | | | |
|---|---|---|---|
| 5,552,695 A | 9/1996 | Schwartz | 323/271 |
| 5,572,113 A | 11/1996 | Barrett | 323/285 |
| 5,627,460 A | * 5/1997 | Bazinet et al. | 323/288 |
| 5,677,619 A | * 10/1997 | Doluca | 323/282 |
| 5,847,554 A | * 12/1998 | Wilcox et al. | 323/282 |
| 6,087,817 A | 7/2000 | Varga | 323/282 |
| 6,218,815 B1 | 4/2001 | Kates et al. | 323/272 |
| 6,262,566 B1 | 7/2001 | Dinh | 323/282 |
| 6,304,066 B1 | * 10/2001 | Wilcox et al. | 323/282 |
| 6,313,616 B1 | 11/2001 | Deller et al. | 323/282 |

* cited by examiner

*Primary Examiner*—Adolf Deneke Berhane
(74) *Attorney, Agent, or Firm*—W. Daniel Swayze, Jr.; W. James Brady; Frederick J. Telecky, Jr.

(57) ABSTRACT

The present invention relates to circuits and method for providing regulated output voltages from an unregulated input voltage. A switching power supply and/or a switching regulator is provided with a control circuit that controls an input signal to a first and second switch coupled in series to an input voltage. A first inductor or winding is coupled to a node between the first and second switch that provides a primary output voltage during switching of the first and second switches. A second inductor or winding is magnetically coupled to the first winding. An auxiliary switch is coupled to the second winding and to rectify an auxiliary output voltage provided at another end of the switch. The voltage drop of the auxiliary switch is matched with the voltage drop of second switch, so that the two voltage drops across the switches substantially cancel one another out.

20 Claims, 5 Drawing Sheets

SYNCHRONOUS COUPLED INDUCTOR SWITCHING REGULATOR WITH IMPROVED OUTPUT REGULATION

TECHNICAL FIELD

The present invention relates to electrical circuits and more particularly to direct current (DC) to direct current (DC) power conversion and regulation.

BACKGROUND OF INVENTION

There is an ever increasing demand for power conversion and regulation circuitry to operate with increased efficiency and reduced power to accommodate for the continuous reduction in size of electronic portable devices. Many times these devices are battery powered, and it is desirable to utilize as little power as possible to operate these devices, so that the battery life is extended. Therefore, the prior 5-volt industry standard has decreased to a 3.3 volt industry standard, which may soon be replaced by an even lower standard. As the regulated voltage levels decrease, the effect that traditional components (e.g., diodes) have on efficiency increases. Additionally, a secondary or auxiliary voltage (e.g., 5 volts) is often desired to operate components having a different voltage requirement than the components utilizing the primary voltage.

Voltage regulators have been implemented as an efficient mechanism for providing a regulated output in power supplies. One such type of regulator is known as a switching regulator or switching power supply, which controls the flow of power to a load by controlling the on and off duty-cycle of one or more power switches coupled to the load. Many different classes of switching regulators exist today. One class of switching regulators is known as a transformer-coupled switching regulator, such as a coupled-inductor buck converter. A conventional coupled-inductor buck converter provides multiple regulated outputs by generating a primary output using a buck converter and adding one or more auxiliary windings to the output inductor, which operate as coupled inductors for secondary or auxiliary outputs.

FIG. 1 illustrates a conventional switching regulator 10 (e.g., a synchronous buck converter). The switching regulator 10 includes a control circuit 12 that is operative to control the duty cycle of pulses provided to a first power switch 14 and a second power switch 16. In the illustration of FIG. I, the first power switch 14 and the second power switch 16 are N-type MOSFET devices coupled in series. The first power switch 14 is coupled to an input voltage ($V_{IN}$) at its drain terminal and a node 18 at its source terminal. The second power switch 16 is coupled to the node 18 at its drain terminal and to ground at its source terminal. The node 18 is coupled to a primary inductor 24, which provides the energy to charge a capacitor 26. The control circuit 12 switches a control pulse between the first power switch 14 and the second power switch 16 in opposing states, causing the first power switch 14 to turn "ON" and the second power switch 16 to turn "OFF". The switching of the first and second power switches provides an input pulse signal, similar to a square wave, that toggles between $V_{IN}$ and ground at the node 18 and the primary inductor 24.

Energy builds up on the primary inductor 24 when the first power switch 14 is "ON", which is transferred to charge the capacitor 26 to an output voltage $V_{OUT1}$. A feedback signal from the output voltage $V_{OUT1}$ of the capacitor 26 is fed back to the control circuit 12. The control circuit 12 utilizes the feedback signal to continuously adjust the duty cycle of the control pulse driving the first and second power switches 14 and 16, and as a result, regulating the output voltage $V_{OUT1}$.

The primary inductor 24 is magnetically coupled to a secondary inductor 22 to form a transformer device 20. Some of the energy in the primary inductor 24 is transferred to the secondary inductor 22 when the second power switch 16 is "ON". The secondary inductor 22 provides a secondary output voltage proportional to the ratio of the number of turns in the secondary inductor 22 divided by the number of turns in the primary inductor 24. The secondary output voltage is added to the primary output voltage $V_{OUT1}$ to provide an output voltage approximately equivalent to an auxiliary output voltage $V_{OUT2}$. A diode 32 rectifies the output from secondary inductor 22 and the rectified signal is provided to the capacitor 28, which charges up to the auxiliary output voltage $V_{OUT2}$. However, since the voltage drop across the diode varies with temperature and current, the auxiliary output voltage $V_{OUT2}$ can easily vary 4–5%. This is unacceptable for the proper operation of many devices. Therefore, in some applications, the voltage provided at the capacitor 28 is increased and provided to a linear regulator 34. However, the linear regulator 34 has additional power and size requirements and decreases the efficiency of the switching regulator 10.

In some applications it is known to eliminate the linear regulator by providing a second feedback signal from the auxiliary output to a control circuit. The second feedback signal can be combined with the first feedback signal from the primary output through resistors so that only one feedback signal is provided to the control circuit. However, in this instance, the control circuit regulates the weighed average of both output voltages and may not provide adequate regulation for both outputs in some loading conditions.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to circuits and a method for providing regulated output voltages from an unregulated input voltage. A switching power supply or switching regulator (e.g., a synchronous buck converter) is provided with a control circuit (e.g., pulse width modulator) that controls an input signal to a first and second switch coupled in series to an input voltage (e.g., unregulated). A first inductor or winding is coupled to a node between the first and the second switch. A primary output voltage is provided at the first inductor or winding during switching of the first and second switches. A second inductor or winding is magnetically coupled to the first inductor. The second inductor or winding provides a secondary output voltage based on the turns ratio of the second winding divided by the first winding.

An auxiliary switch is coupled to the second winding to rectify an auxiliary output voltage provided at another end of the auxiliary switch. A switch input control line is coupled between the node and the auxiliary switch to provide switching control to the auxiliary switch, such that both the auxiliary switch and the second switch are closed or on at the same time. The voltage drop of the auxiliary switch is matched with the voltage drop of second switch when both switches are closed or on, so that the two voltage drops across the switches substantially cancel one another out. Therefore, feedback from the auxiliary output voltage can be eliminated.

In one aspect of the invention, the first and second switches are N-type MOSFET devices and the auxiliary switch is a P-type MOSFET device. The gate of the P-type MOSFET device can be coupled to a node between the first and second switches. The matching of voltage drops can be accomplished by determining an "ON" state resistance of the auxiliary switch based on the "ON" state resistance of the second switch, the maximum load currents for both the primary and auxiliary output voltages and the turns ratio of the windings. Alternatively, the "ON" state resistance of the auxiliary switch based on the "ON" state resistance of the second switch can be selected for other loads (e.g. nominal) based on the particular application being employed.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to circuits and a method for providing regulated output voltages from an unregulated input voltage. The present invention provides for a simplified switching power supply or regulator at reduced costs by eliminating parts and also at a reduced complexity by eliminating the need of a feedback signal from an auxiliary output voltage to compensate for variations in the auxiliary output voltage. The present invention matches voltage drops in switching devices so that the effects of the voltage drops are substantially cancelled. Therefore, the voltage variation due to the auxiliary switch can be reduced to less than about 1%.

Figure 1:
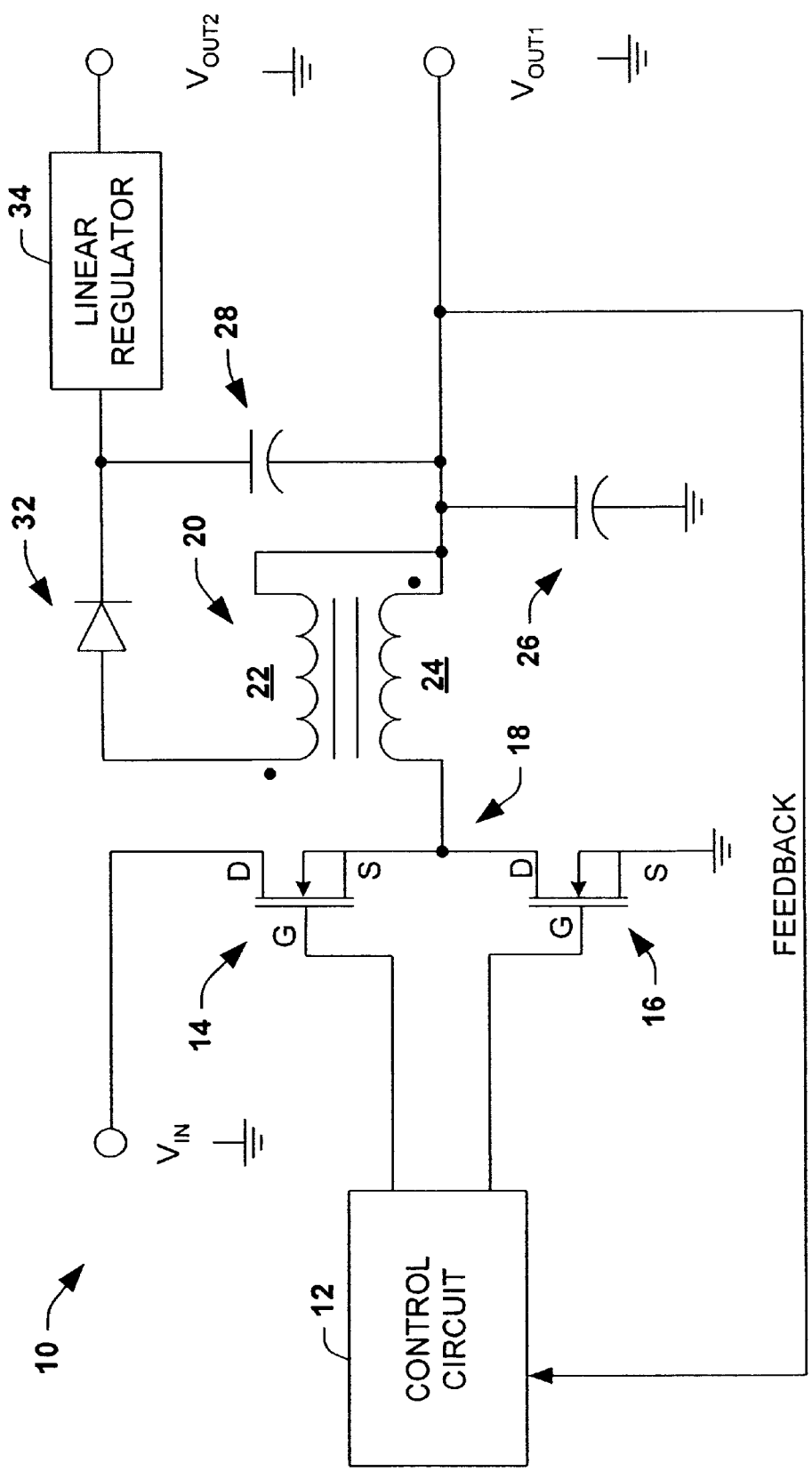
FIG. 1 illustrates a schematic block diagram of a prior art switching regulator.
Figure 2:
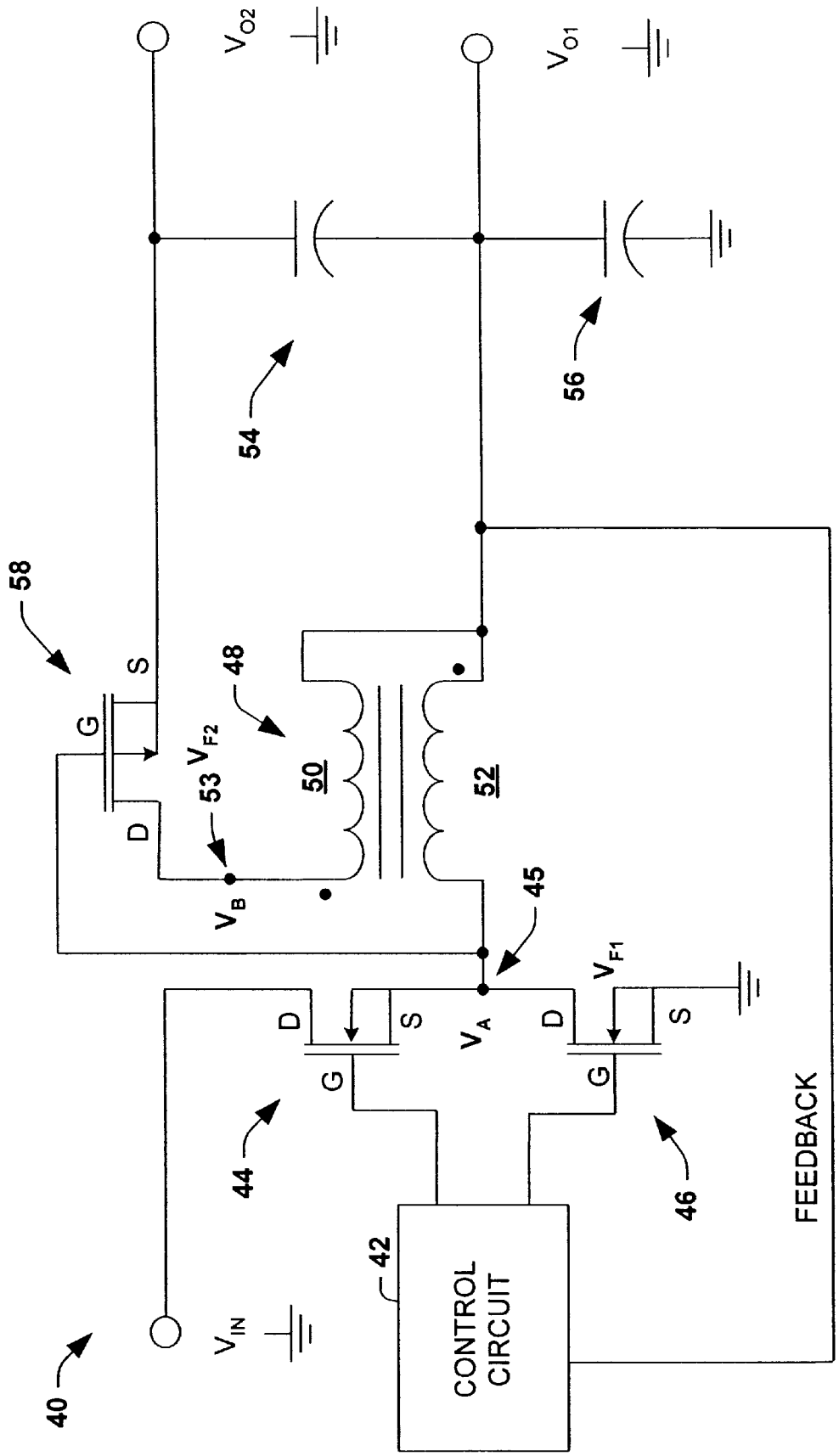
FIG. 2 illustrates a schematic block diagram of a switching regulator in accordance with an aspect of the present invention.

FIG. 2 illustrates a switching regulator 40 in accordance with an aspect of the present invention. The switching regulator 40 can be, for example, a synchronous buck converter. The switching regulator 40 includes a control circuit 42 (e.g., a pulse width modulator) that is operative to control the duty cycle of pulses provided to a first power switch 44 and a second power switch 46. In one aspect of the invention, the first power switch 44 and the second power switch 46 are N-type MOSFET devices coupled in series. The first power switch 44 is coupled to an input voltage ($V_{IN}$) at its drain terminal and a node 45 at its source terminal. The second power switch 46 is coupled to its drain terminal at the node 45 and to ground at its source terminal. The node 45 is coupled to a first or primary inductor or winding 52, which provides the energy to charge a capacitor 56.

The control circuit 42 switches a control pulse or switching signal between the first power switch 44 and the second power switch 46 in opposing states, causing the first power switch 44 to turn "ON" and the second power switch 46 to turn "OFF". The switching of the first and second power switches 44 and 46 provides an input pulse signal, similar to a square wave, that toggles between $V_{IN}$ and ground at the node 45 and a first end of the first inductor 52. In one aspect of the invention, the first power switch 44 is turned on ¼ of the time pulling node 45 to $V_{IN}$, and the second power switch 46 is turned on ¾ of the time pulling node 45 to ground. This provides a primary output voltage ($V_{O1}$) equivalent to about $V_{IN}/4$. For example, if $V_{IN}$ is about 12–14 volts then $V_{O1}$ would be about 3.3 volts.

Energy builds up in the first inductor 52 when the first power switch 44 is "ON", which is transferred to charge the capacitor 56 to an output voltage $V_{O1}$. A feedback signal of the output voltage $V_{O1}$ residing on the capacitor 56 is fed back to the control circuit 42. The control circuit 42 utilizes the feedback signal to continuously adjust the duty cycle of the control signals driving the first and second power switches 44 and 46 and as a result regulating the output voltage $V_{O1}$.

The first inductor 52 and a second inductor 50 form a transformer device 48. Some of the energy in the first inductor 52 is transferred to a second or secondary inductor 50 when the second power switch 46 is "ON". The second inductor 50 provides a secondary output voltage proportional to the ratio of the number of turns in the second inductor 50 divided by the number of turns in the first inductor 52. The secondary output voltage is added to the primary output voltage $V_{O1}$ to provide an output voltage approximately equivalent to an auxiliary output voltage $V_{O2}$. An auxiliary switch 58 is coupled to the second inductor 48 at a node 53. The auxiliary switch 58 rectifies the auxiliary output voltage $V_{O2}$. A switch input control line is coupled between the node and the auxiliary switch 58 to provide switching control to the auxiliary switch.

The auxiliary switch 58 can be a P-channel FET with its gate coupled to the node 45 between the first and second power switches 44 and 46. The drain of the P-channel FET 58 and one end of the second inductor 50 are coupled to the node 53, while the other end of the second inductor 50 is coupled to $V_{O1}$ which includes the capacitor 56 and the first inductor 52. The source of the P-channel FET is coupled to a capacitor 54. The other end of the capacitor 54 is coupled to $V_{O1}$. The capacitor 54 charges to a voltage level defined by the primary output voltage $V_{O1}$ plus the turns ratio of the transformer 48. A voltage drop $V_{F1}$ across the second power switch 46 and a voltage drop $V_{F2}$ across the auxiliary switch 58 effects the auxiliary output voltage $V_{O2}$. Therefore, by selecting an auxiliary switch with a voltage drop that substantially cancels the voltage drop of the second power switch 46, the need for a feedback signal from the auxiliary output voltage $V_{O2}$ or the need for post regulation can be eliminated.

Figure 3:
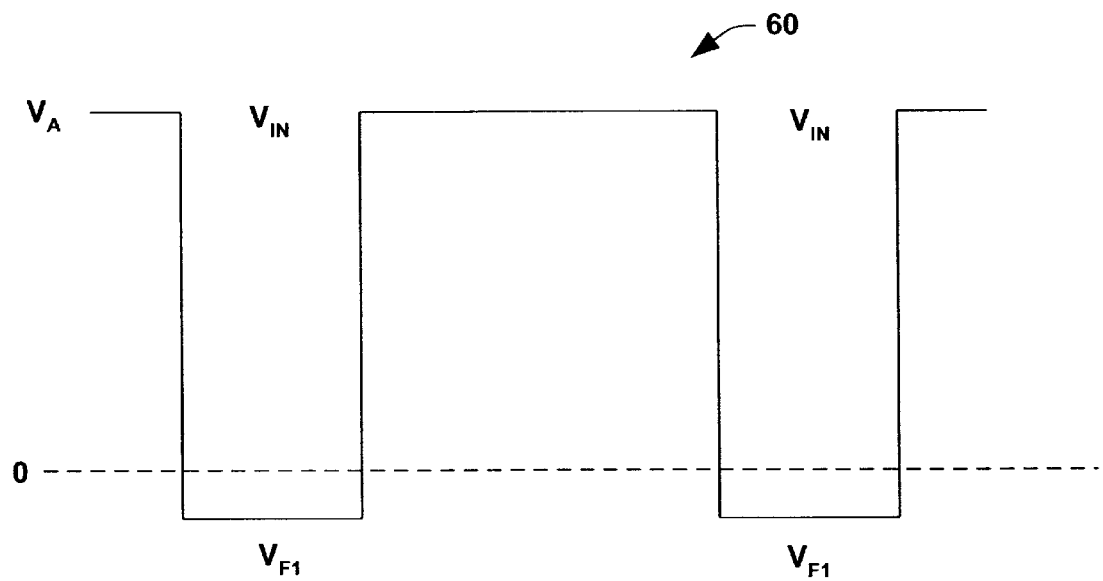
FIG. 3 illustrates a graph of a pulse waveform of the voltage $V_A$ at a node between the first and second power switches during switching of the switching regulator.
Figure 4:
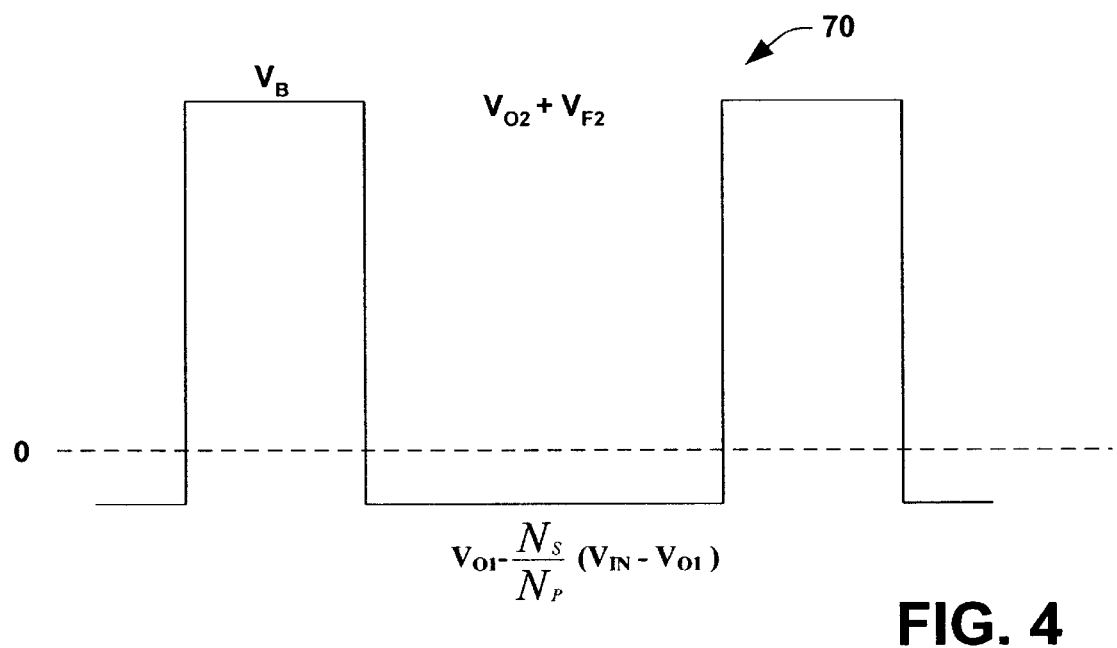
FIG. 4 illustrates a graph of a pulse waveform of the voltage $V_B$ at a node between an auxiliary switch and a second winding during switching of the switching regulator.

The input signal that controls the auxiliary switch 58 toggles with the input signal at the node 45, such that the auxiliary switch 58 is on at the same time as the second power switch 46. FIG. 3 illustrates a graph of a pulse waveform 60 of the voltage $V_A$ provided at the node 45, while FIG. 4 illustrates a graph of a corresponding waveform 70 of the voltage $V_B$ provided at the node 53 during normal switching of the control signals to the first and second power switches 44 and 46 and the auxiliary switch 58. The voltage $V_A$ illustrated in FIG. 3 is at is highest point at $V_{IN}$ and at its lowest point at $V_{F1}$. The voltage $V_B$ toggles in an opposite direction to $V_A$. The voltage $V_B$ is at its highest point at $V_{O2}+V_{F2}$ and at its lowest point at $V_{O1}-N_S/N_P*(V_{IN}-V_{O1})$ where $N_S$ is the number of turns of the secondary inductor 50 and $N_P$ is the number of turns of the primary inductor 52.

In accordance with one aspect of the present invention, the "ON" resistance of both the second power switch 46 and the auxiliary switch 58 are selected such that the voltage drop across the second power switch 46 and the auxiliary switch 58 substantially cancel one another out. In this way, the necessity to provide a feedback signal from the auxiliary output voltage $V_{O2}$ can be eliminated because the voltage variation of the auxiliary output can be maintained within acceptable ranges. The following equations provide for facilitating selection of the appropriate "ON" resistance of the auxiliary switch 58 based on the "ON" resistance of the second power switch 46, the turns ratio of the transformer 48 and the maximum load currents of the primary output voltage $V_{O1}$ and the auxiliary output $V_{O2}$. The following equation (EQ.) can be defined when both the second power switch 46 and auxiliary switch 58 are on:

$$\frac{N_S}{N_P}(V_{O1}+V_{F1}) - V_{F2} = V_{O2} - V_{O1} \quad \text{(EQ. 1)}$$

where $N_S$ is the number of turns of the secondary inductor 50, $N_P$ is the number of turns of the primary inductor 52, $V_{O1}$ is the primary output voltage, $V_{O2}$ is the auxiliary output voltage, $V_{F1}$ is the "ON" voltage drop of the second power switch 46 and $V_{F2}$ is the "ON" voltage drop of the auxiliary switch 58. EQ. 1 can be rewritten as follows:

$$V_{O2} = \frac{N_S}{N_P} * (V_{O1}+V_{F1}) + V_{O1} - V_{F2} \quad \text{(EQ. 2)}$$

EQ. 2 can be further rewritten as:

$$V_{O2} = \left(1 + \frac{N_S}{N_P}\right)*V_{O1} + \left(V_{F1}*\frac{N_S}{N_P} - V_{F2}\right) \quad \text{(EQ. 3)}$$

where $$\left(V_{F1}*\frac{N_S}{N_P} - V_{F2}\right)$$

is the error term associated with the second power switch 46 and the auxiliary switch 58. Therefore, to reduce the $V_{O2}$ output voltage dependency on the voltage drops across switches 46 and 58, the following equation if equal would provide effective cancellation.

$$V_{F2} = V_{F1}*\frac{N_S}{N_P} \quad \text{(EQ. 4)}$$

EQ. 4 can be rewritten in terms of the second power switch 46 and the auxiliary switch 58 "ON" resistance at maximum output load.

$$I_{O2}*R_{DS2} = I_{O1}*R_{DS1}*\frac{N_S}{N_P} \quad \text{(EQ. 5)}$$

Therefore, the optimally selected auxiliary switch 58 "ON" resistance is based on the following equation:

$$R_{DS2} = \frac{I_{O1}}{I_{O2}}*\frac{N_S}{N_P}*R_{DS1} \quad \text{(EQ. 6)}$$

The following equations 7–12 provide additional parameters associated with the selection of the auxiliary switch 58:

$$V_{F2GS\,MAX}(ON) = V_{O2}+V_{F1} \quad \text{(EQ. 7)}$$

EQ. 7 defines the maximum gate to source voltage experienced by the auxiliary switch 58 during turn on.

$$V_{F2GS\,MIN}(ON) = V_{O1} \quad \text{(EQ. 8)}$$

EQ. 8 defines the gate to source voltage of switching regulator 40 at start up when the auxiliary switch 58 is "ON" and capacitor 54 is discharged.

$$V_{F2GS\,MAX}(OFF) = V_{IN} \quad \text{(EQ. 9)}$$

EQ. 9 defines the gate to source voltage of switching regulator 40 at start up when the auxiliary switch 58 is "OFF" and capacitors 54 and 56 are discharged.

$$V_{F2GS\,NOM}(OFF) = V_{IN}-V_{O2} \quad \text{(EQ. 10)}$$

EQ. 10 defines the gate to source voltage during nominal operating conditions when the auxiliary switch 58 is "OFF".

$$V_{F2DS}(OFF) = V_{O2} - \left[V_{O1} - \frac{N_S}{N_P}(V_{IN}-V_{O1})\right] \quad \text{(EQ. 11)}$$

EQ. 11 defines the drain to source voltage at nominal operating conditions when the auxiliary switch 58 is "OFF". EQ. 11 can be rewritten as follows:

$$V_{F2DS}(OFF) = V_{O2} - V_{O1}\left(1+\frac{N_S}{N_P}\right) + \frac{N_S}{N_P}*V_{IN} \quad \text{(EQ. 12)}$$

which is approximately equal to $$\frac{N_S}{N_P}*V_{IN}.$$

The operational boundaries of $V_{F2GS}$ are between $V_{O1}$ and $V_{IN}$.

Table I illustrates some parameters evaluated for the auxiliary switch 58 at varying primary and auxiliary output voltages. The parameters are based on the second power switch 46 having an "ON" state resistance of approximately 0.011 ohms, a primary maximum load of approximately 3 amps with an auxiliary maximum load of approximately 0.15 amps. It is to be appreciated that the parameters can change based on changes in the "ON" state resistance of the second power switch 46, the desired primary and auxiliary maximum loads and the desired primary and auxiliary outputs. The present example has been illustrated with respect to selecting an auxiliary switch 58 with an "ON" state resistance based on maximum loads for both the primary and auxiliary outputs. However, other load values (e.g., nominal load) can be selected to achieve optimal results based on the particular application.

TABLE I

| $V_{INMAX}$ (Vdc) | $V_{O1}$ (Vdc) | Ns/Np | $V_{F1}$ (Vdc) | $V_{F2}$ (Vdc) | $V_{O2}$ (Vdc) | P-CH $V_{GS\_MIN}$ (Vdc) | P-CH $V_{GS\_MAX}$ (Vdc) | P-CH $V_{DS\_MAX}$ (Vdc) | P-CH(OPT) $R_{DS2\_PCH}$ (ohms) |
|---|---|---|---|---|---|---|---|---|---|
| 12 | 5    | 2.000 | 0.033 | 0.066 | 15.00 | 5    | 12 | 24 | 0.440 |
| 12 | 3.33 | 0.500 | 0.033 | 0.017 | 5.00  | 3.33 | 12 | 6  | 0.110 |
| 12 | 2.5  | 1.000 | 0.033 | 0.033 | 5.00  | 2.5  | 12 | 12 | 0.220 |
| 12 | 2.5  | 0.333 | 0.033 | 0.011 | 3.33  | 2.5  | 12 | 4  | 0.073 |
| 12 | 2.5  | 0.167 | 0.033 | 0.006 | 2.92  | 2.5  | 12 | 2  | 0.037 |
| 12 | 1.8  | 0.167 | 0.033 | 0.006 | 2.10  | 1.8  | 12 | 2  | 0.037 |
| 12 | 1.5  | 0.500 | 0.033 | 0.017 | 2.25  | 1.5  | 12 | 6  | 0.110 |
| 12 | 1.5  | 0.333 | 0.033 | 0.011 | 2.00  | 1.5  | 12 | 4  | 0.073 |

Figure 5:
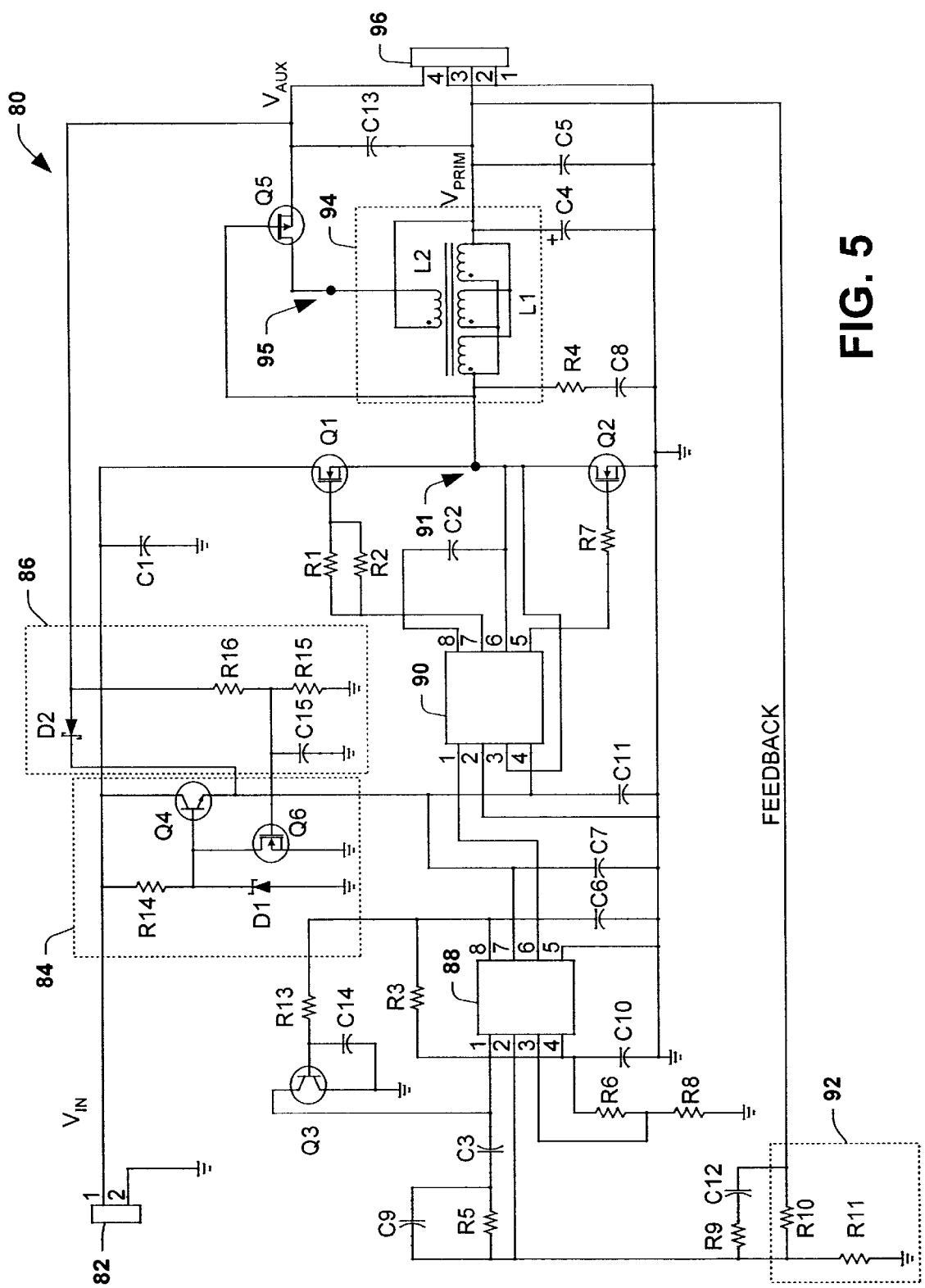
FIG. 5 illustrates a schematic diagram of a switching power supply in accordance with an aspect of the present invention.

FIG. 5 illustrates a switching power supply device 80 for providing a primary and auxiliary output voltage in accordance with an aspect of the present invention. The switching power supply device 80 includes an input connector 82 for connecting to a non-regulated DC source and an output connector 96 for providing a regulated primary and auxiliary DC voltage output. The switching power supply device 80 includes a pulse width modulator device 88 coupled to a driver device 90. The pulse width modulator device 88 and the driver device 90 are operative to control the duty cycle of pulses provided to a first transistor switch Q1 and a second transistor switch Q2. In the example of FIG. 5, the first transistor switch Q1 and the second transistor switch Q2 are N-type MOSFET devices coupled in series. The first transistor switch Q1 is coupled to an input voltage ($V_{IN}$) from the connector 82 at its drain terminal and a node 91 at its source terminal. A capacitor C1 is provided between the input voltage and ground to filter the input voltage $V_{IN}$ as it is received by the switching power supply 80.

The second transistor switch Q2 is coupled to its drain terminal at the node 91 and to ground at its source terminal. A capacitor C8 and a resistor R4 are coupled in series between the node 91 and ground. The node 91 is also coupled to a first or primary inductor or winding L1 of a transformer 94. The first inductor L1 provides the energy to charge a pair of capacitors C4 and C5.

The pulse width modulator device 88 switches a control pulse to the driver device 90 which provides an input signal or switching signal causing the first transistor switch Q1 and the second transistor switch Q2 to turn "ON" and "OFF" in opposing states. The switching of the first and second transistor switches provides an input pulse signal, similar to a square wave, that toggles between the first transistor switch Q1 and the second transistor switch Q2 causing the node 91 to toggle between $V_{IN}$ and ground. The driver device 90 is coupled to the first transistor switch Q1 through a resistor R1 in parallel with a resistor R2. The driver device 90 is coupled to the second transistor switch Q2 though a resistor R7. The driver device 90 also includes a capacitor C2 for providing a bootstrap voltage for driving Q1. In one aspect of the invention, the first transistor switch Q1 is turned on ¼ of the time pulling node 91 to $V_{IN}$, and the second power switch Q2 is turned on ¾ of the time pulling node 91 to ground, resulting in a primary output voltage ($V_{PRIM}/4$) of 3.3 volts for an input voltage of 12–14 volts. Energy builds up in the first inductor L1 when the first transistor switch Q1 is "ON", which is transferred to charge the capacitors C4 and C5.

A feedback signal of the output voltage $V_{PRIM}$ on the capacitors C4 and C5 is fed back to a feedback pin of the pulse width modulator 88 through a duty cycle network 92. The duty cycle of the pulse width modulator 88 and, thus, the primary output voltage is set by the selection of resistors R10 and R11 of the duty cycle network 92. The pulse width modulator 88 utilizes the feedback signal to continuously adjust the duty cycle of the input signals driving the first and second transistor switches Q1 and Q2 and as a result regulating the primary output voltage $V_{PRIM}$. Capacitor C10, resistors R6, R3, and R8 set the switching frequency of the pulse width modulator 88. Capacitors C9, C3, C12 and resistors R5 and R9 provide appropriate compensation circuitry, while Q3, R13, C14 and C6 provide appropriate soft start circuitry. It is to be appreciated that the switching frequency circuitry, compensation circuitry and soft start circuitry can vary depending on the type of pulse width modulator being employed.

The first inductor L1 is magnetically coupled to a second or secondary inductor or winding L2 forming the transformer device 94. Some of the energy in the first inductor L1 is transferred to the second inductor L2 when the second transistor switch Q2 is "ON". The first inductor L1 is illustrated with three windings for current rating purposes. However, a single winding can be used in place of the three windings illustrated in the switching power supply 80. The second inductor L2 provides a secondary output voltage proportional to the ratio of the number of turns in the second inductor L2 divided by the number of turns in the first inductor L1. The secondary output voltage is added to the primary output voltage $V_{PRIM}$ to provide an output voltage approximately equivalent to an auxiliary output voltage $V_{AUX}$. An auxiliary switch Q5 is coupled to the inductor L2. The auxiliary switch Q5 is a P-channel FET with its gate coupled between the first and second transistor switches Q1 and Q2 at the node 91. The drain of the P-channel FET Q5 and one end of the second inductor L2 are coupled to a node 95, while the other end of the second inductor L2 is coupled to $V_{PRIM}$, capacitors C4 and C5 and the first inductor L1. The source of the P-channel FET Q5 is coupled to a capacitor 13 and other end of the capacitor C13 is coupled to $V_{PRIM}$. The capacitor C13 charges to a voltage level defined by the primary output voltage $V_{PRIM}$ plus an additional voltage set by the turns ratio of the transformer 94. The auxiliary output voltage $V_{AUX}$ is provided at the connector 96.

The switching power supply 80 includes a startup circuit 84 comprised of resistor R14, diode D1, transistor Q4 and transistor Q6. The startup circuit 84 provides power from $V_{IN}$ to the pulse width modulator device 88 and the driver device 90 during initial startup. The auxiliary output voltage $V_{AUX}$ is fed back to a shutoff circuit 86 which is coupled to the startup circuit 84. The shutoff circuit 86 includes a diode D2, a resistor R16, a resistor R15 and a capacitor C15. The shutoff circuit 86 disables the startup circuit 84 when the auxiliary output voltage $V_{AUX}$ reaches a predetermined level. A capacitor C7 holds charge from the input voltage or the auxiliary output voltage $V_{AUX}$ and provides power to the pulse width modulator 88, while the capacitor C11 holds charge from the input voltage $V_{IN}$ or the auxiliary output voltage $V_{AUX}$ for the driver device 90.

The input signal to the gate of the auxiliary switch Q5 toggles with the input signal at the node 91, such that the auxiliary switch Q5 is on at the same time as the second power switch Q2. The resistance of both the second transistor switch Q2 and the auxiliary switch Q5 are selected such that the voltage drop across the second power switch Q2 and the auxiliary switch Q5 substantially cancel one another out. In this way, the necessity to provide a feedback signal from the auxiliary output voltage $V_{AUX}$ is eliminated because the voltage variation of the auxiliary output can be maintained within acceptable ranges.

Figure 6:
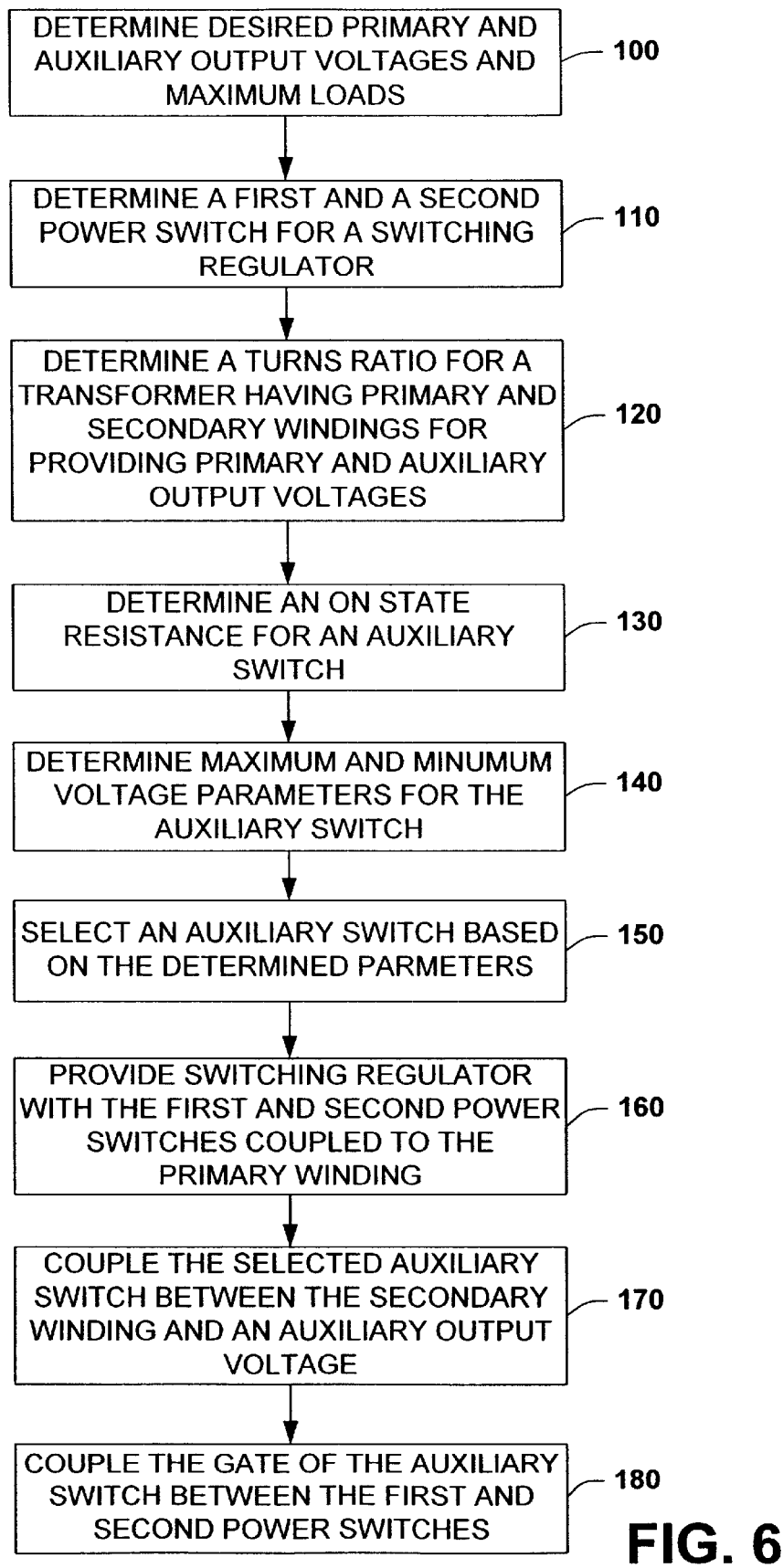
FIG. 6 illustrates a flow diagram of a methodology for providing a switching regulator in accordance with an aspect of the present invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates one particular methodology for providing a switching regulator with a primary regulated output voltage and an auxiliary regulated output voltage. The methodology begins at 100 where the desired primary output voltage and auxiliary output voltage is determined. At 110, the first and second power switches are selected for providing a switching regulator. At 120, the turns ratio is determined for a transformer having primary and secondary windings for providing primary and auxiliary output voltages. At 130, an "ON" state resistance for the auxiliary switch is determined. The "ON" state resistance can be determined by evaluating the expression:

$$R_{DS2} = \frac{I_{O1}}{I_{O2}} * \frac{N_S}{N_P} * R_{DS1}$$

where $N_S$ is the number of turns of the secondary inductor, $N_P$ is the number of turns of the primary inductor, 101 is the maximum output load of the primary voltage, $I_{O2}$ is the maximum output load of the auxiliary voltage, $R_{DS1}$ is the "ON" resistance of the second transistor switch and $R_{DS2}$ is the "ON" resistance of the auxiliary switch. At 140, the maximum and minimum voltage parameters of the auxiliary switch are determined, for example, utilizing the equations 7–12. At 150, and auxiliary switch is selected based on the above determined parameters and the determined "ON" state resistance.

At 160, a switching regulator is provided with a control circuit coupled to the selected first and second power switches with primary windings of the selected transformer coupled to an input node between the first and second power switches to provide a primary output voltage. At 170, the selected auxiliary switch is coupled between the secondary windings and the auxiliary output voltage. At 180, the gate of the auxiliary switch is coupled to the node between the first and second power switches.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A switching regulator comprising:
   a first power switch and a second power switch coupled in series, the first power switch being coupled to an input voltage;
   a first winding magnetically coupled to a second winding, the first winding coupled to a node between the first power switch and the second power switch;
   a control circuit operative to control a duty cycle of an input signal provided to the first power switch and the second power switch resulting in the generation of a primary output voltage at the first winding and an auxiliary output voltage at the second winding; and
   an auxiliary switch coupled to the second winding that rectifies the auxiliary output voltage generated by the second winding, the auxiliary output voltage having a switch input control being coupled to the node and the auxiliary switch being selected to have a voltage drop that substantially cancels the voltage drop of the second power switch when both the second power switch and the auxiliary switch are closed.

2. The switching regulator of claim 1, the first and second power switches being N-type MOSFET devices and the auxiliary switch being a P-type MOSFET device.

3. The switching regulator of claim 2, the P-type MOSFET device having an "ON" resistance that is determined by evaluating the expression:

$$R_{DS2} = \frac{I_{O1}}{I_{O2}} * \frac{N_S}{N_P} * R_{DS1},$$

where $N_S$ is the number of turns of the second winding, $N_P$ is the number of turns of the first winding, $I_{O1}$ is the maximum output load of the primary output voltage, $I_{O2}$ is the maximum output load of the auxiliary output voltage, $R_{DS1}$ is the "ON" resistance of the second power switch and $R_{DS2}$ is the "ON" resistance of the auxiliary switch.

4. The switching regulator of claim 1, the control circuit being a pulse width modulator.

5. The switching regulator of claim 4, further comprising a feedback circuit coupled to provide a feedback signal from the primary output voltage to the control circuit, the control circuit utilizing the feedback signal to continuously adjust the duty cycle of the input signal.

6. The switching regulator of claim 1 being a synchronous buck converter.

7. A switching power supply comprising:
   a pulse width modulator that generates a switching signal with a controllable duty cycle;
   a first transistor switch and a second transistor switch being driven by the switching signal;

a first winding magnetically coupled to a second winding, the first winding having a first end coupled to a node between the first transistor switch and the second transistor switch, such that a primary output voltage is generated at the first winding and an auxiliary output voltage is generated at the second winding; and an auxiliary transistor switch coupled to the first end of the second winding, the gate being coupled to the node between the first and second transistor switches, the auxiliary transistor switch having an "ON" resistance selected to have a voltage drop that substantially cancels the voltage drop of the second transistor switch when both switches are "ON".

8. The switching power supply of claim 7, the first and second transistor switches being N-type MOSFET devices and the auxiliary transistor switch being a P-type MOSFET device.

9. The switching power supply of claim 8, the P-type MOSFET device having an "ON" resistance that is determined by evaluating the expression:

$$R_{DS2} = \frac{I_{O1}}{I_{O2}} * \frac{N_S}{N_P} * R_{DS1},$$

where $N_S$ is the number of turns of the second winding, $N_P$ is the number of turns of the first winding, $I_{O1}$ is the maximum output load of the primary output voltage, $I_{O2}$ is the maximum output load of the auxiliary output voltage, $R_{DS1}$ is the "ON" resistance of the second transistor switch and $R_{DS2}$ is the "ON" resistance of the auxiliary transistor switch.

10. The switching power supply of claim 7, further comprising a feedback signal coupled from the primary output voltage to the pulse width modulator, the pulse width modulator utilizing the feedback signal to continuously adjust the duty cycle of the switching signal.

11. The switching power supply of claim 7, further comprising a driver device coupled to the pulse width modulator for driving the switching signal.

12. The switching power supply of claim 9, further comprising a startup circuit operative to provide operating voltage from the input voltage to the pulse modulator and the driver device during power up.

13. The switching power supply of claim 12, further comprising a shutdown circuit operative to turn off the startup circuit and provide operating voltage from the auxiliary output voltage to the pulse width modulator and the driver device upon the auxiliary output voltage reaching a predetermined voltage level.

14. The switching power supply of claim 13, further comprising a duty cycle network circuit coupled to provide a feedback signal from the primary output voltage to the pulse width modulator, the pulse width modulator utilizing the feedback signal to continuously adjust the duty cycle of the input signal.

15. A method of providing a switching regulator with a primary output voltage and an auxiliary output voltage, the switching regulator having a control circuit controlling a duty cycle of a first and second switch coupled in series to an input voltage, the first and second switch having a node there between, coupled to a first winding to provide a primary output voltage and having a second winding magnetically coupled to the first winding to provide an auxiliary output voltage, the method comprising:

determining a desired primary output voltage and a desired auxiliary output voltage and maximum loads for both the primary output voltage and the auxiliary output voltage;

determining a first and a second power switch for the switching regulator;

determining a turns ratio for the first and the second winding for providing the desired auxiliary output voltage;

determining a desired "ON" state resistance for an auxiliary switch that will substantially cancel out the voltage drop associated with the second power switch;

selecting an auxiliary switch based on the desired "ON" state resistance;

assembling the first and second power switches and the first and the second windings into the switching regulator with the control circuit; and coupling the auxiliary switch between the second coil and the auxiliary output voltage.

16. The method of claim 15, further comprising determining maximum and minimum voltage parameters of the auxiliary switch prior to selecting an auxiliary switch.

17. The method of claim 15, the first and second power switches being N-type MOSFET devices and the auxiliary switch being a P-type MOSFET device.

18. The method of claim 15, further comprising coupling the gate of the auxiliary switch to the node between the first and second power switches.

19. The method of claim 15, the "ON" resistance being determined by evaluating the expression:

$$R_{DS2} = \frac{I_{O1}}{I_{O2}} * \frac{N_S}{N_P} * R_{DS1},$$

where $N_S$ is the number of turns of the second winding, $N_P$ is the number of turns of the first winding, $I_{O1}$ is the maximum output load of the primary output voltage, $I_{O2}$ is the maximum output load of the auxiliary output voltage, $R_{DS1}$ is the "ON" resistance of the second transistor switch and $R_{DS2}$ is the "ON" resistance of the auxiliary transistor switch.

20. The method of claim 15, the switching regulator being a synchronous buck converter.

* * * * *